United States Patent
Cai et al.

(10) Patent No.: US 7,714,082 B2
(45) Date of Patent: May 11, 2010

(54) GAS-PHASE POLYMERIZATION PROCESS TO ACHIEVE A HIGH PARTICLE DENSITY

(75) Inventors: Ping P. Cai, Hurricane, WV (US); William A. Matthews, Victoria, TX (US)

(73) Assignee: Univation Technologies, LLC, Houston, TX (US)

(*) Notice: Subject to any disclaimer, the term of this patent is extended or adjusted under 35 U.S.C. 154(b) by 0 days.

(21) Appl. No.: 11/243,406

(22) Filed: Oct. 4, 2005

(65) Prior Publication Data

US 2007/0078239 A1    Apr. 5, 2007

(51) Int. Cl.
C08F 2/00      (2006.01)
C08F 210/00    (2006.01)

(52) U.S. Cl. .................. 526/68; 526/348; 526/59; 526/206; 526/901

(58) Field of Classification Search ............ 526/68, 526/901, 348, 59, 206
See application file for complete search history.

(56) References Cited

U.S. PATENT DOCUMENTS

| | | | |
|---|---|---|---|
| 3,709,853 A | | 1/1973 | Karapinka et al. |
| 3,709,954 A | | 1/1973 | Karol et al. |
| 4,077,904 A | | 3/1978 | Noshay et al. |
| 4,102,817 A | | 7/1978 | Throckmorton et al. |
| 4,155,880 A | | 5/1979 | Throckmorton et al. |
| 4,182,814 A | | 1/1980 | Bernemann et al. |
| 4,376,062 A | | 3/1983 | Hamer et al. |
| 4,379,758 A | | 4/1983 | Wagner et al. |
| 4,472,559 A | | 9/1984 | Maehara et al. |
| 4,508,842 A | * | 4/1985 | Beran et al. .............. 502/112 |
| 4,530,914 A | | 7/1985 | Ewen et al. |
| 4,543,399 A | | 9/1985 | Jenkins, III et al. |
| 4,588,790 A | | 5/1986 | Jenkins, III et al. |
| 4,665,047 A | | 5/1987 | Slaugh et al. |
| 4,752,597 A | | 6/1988 | Turner |
| 4,994,534 A | | 2/1991 | Rhee et al. |
| 5,218,071 A | | 6/1993 | Tsutsui et al. |
| 5,272,236 A | | 12/1993 | Lai et al. |
| 5,278,272 A | | 1/1994 | Lai et al. |
| 5,317,036 A | | 5/1994 | Brady, III et al. |
| 5,352,749 A | | 10/1994 | DeChellis et al. |
| 5,436,304 A | | 7/1995 | Griffin et al. |
| 5,453,471 A | | 9/1995 | Bernier et al. |
| 5,462,999 A | | 10/1995 | Griffin et al. |
| 5,527,752 A | | 6/1996 | Reichle et al. |
| 5,834,571 A | | 11/1998 | Bernier et al. |
| 6,022,933 A | * | 2/2000 | Wright et al. .............. 526/68 |
| 6,864,332 B2 | | 3/2005 | Braganca et al. |
| 2005/0137364 A1 | | 6/2005 | Cai et al. |
| 2005/0267268 A1 | | 12/2005 | Hendrickson |

FOREIGN PATENT DOCUMENTS

| | | |
|---|---|---|
| EP | 050477 A1 | 4/1982 |
| EP | 1054024 | 11/2000 |
| EP | 1110975 | 6/2001 |
| EP | 1195385 | 4/2002 |
| WO | WO-96/04322 | 2/1996 |
| WO | WO-96/04323 | 2/1996 |
| WO | WO-99/07745 | 2/1999 |
| WO | WO-00/44792 | 8/2000 |
| WO | WO-00/68274 | 11/2000 |
| WO | WO 02/46246 A2 | 6/2002 |
| WO | WO-03/042253 | 5/2003 |

OTHER PUBLICATIONS

S. Floyd, et al.; Polymerization of Olefins through Heterogeneous Catalysis. III. Polymer Particle Modelling with an Analysis of Intraparticle Heat and Mass Transfer Effects; *Journal of Applied Polymer Science*, vol. 32, 2935-2960 (1986).
Chiu-Hsun Lin; Control of polymer particle size by supported metallocene catalysts, *Catalysis Letters*, 68 (2000) 63-65.
R. A. Hutchinson, et al.; Polymerization of Olefins through Heterogeneous Catalysis X: Modeling of Particle Growth and Morphology; *Journal of Applied Polymer Science*, vol. 44, 1389-1414 (1992).
S. Floyd, et al.; Polymerization of Olefins Through Heterogeneous Catalysis IV. Modeling of Heat and Mass Transfer Resistance in the Polymer Particle Boundary Layer; *Journal of Applied Polymer Science*, vol. 31, 2231-2265 (1986).
Fukuzawa, Tsuyoshi, et al.; Growth of Particles in Cluster-Size Range in Low Pressure and Low Power SiH₄ rf Discharges, *J. of Applied Physics*, vol. 86, No. 7 (1999), pp. 3543-3549.
Webb, Paul A., *Volume and Density Determinations for Particle Technologists*, Feb. 2001, Micromeritics Instrument Corporation publication.
EP1931714 Notice of Opposition (Nov. 9, 2009).
ASTM Designation: D2873-94 (Reapproved 1999).

* cited by examiner

*Primary Examiner*—William K Cheung
(74) *Attorney, Agent, or Firm*—Kevin M. Faulkner; Leandro Arechederra, III

(57) ABSTRACT

A process for increasing a granular particle density of a polymeric product using at least one particle density promoting agent is described. The process includes passing a gaseous stream comprising at least one monomer through a fluidized bed reactor in the presence of a catalyst to form a polymeric product having a first granular particle density of less than or equal to about 850 kg/m³, contacting the polymeric product with at least one particle density promoting agent to increase the granular particle density of the polymeric product by at least 2%, withdrawing the polymeric product having an increased granular particle density and a recycle stream comprised of unreacted monomers, and cooling and reintroducing the recycle stream into the fluidized bed reactor with sufficient additional monomer to replace the monomer polymerized and withdrawn as the polymeric product.

19 Claims, 2 Drawing Sheets

GAS-PHASE POLYMERIZATION PROCESS TO ACHIEVE A HIGH PARTICLE DENSITY

BACKGROUND OF INVENTION

1. Field of the Invention

The invention relates generally to a process for polyolefin manufacturing in gas-phase fluidized bed polymerization reactors.

2. Background Art

Gas phase fluidized bed reactors for the production of olefin polymers are well known in the art. Gas phase processes successfully allow for production of a vast array of polymers, while reducing energy requirements and capital investments required to run the gas phase processes as compared to other polymerization processes.

Gas phase polymerization processes typically run a continuous cycle of a gaseous stream through the reactor. Generally, the stream contains one or more monomers. The stream is continuously passed through the fluidized bed under reactive conditions in the presence of a catalyst. The stream is withdrawn from the fluidized bed and recycled back into the reactor. Simultaneously, polymer products are withdrawn from the reactor and additional monomer is added to the stream to replace the polymerized monomer. In gas phase fluidized bed polymerizations, the polymer products are discharged from the reactor in a granular form. As compared with the polymer products from other types of reactors (e.g., slurry reactor, solution reactor), dry granular particles advantageously allow for easy flow and transportation, without need for removal of solvents and/or catalysts.

By continuously flowing the stream of monomers through the reactor under reactive conditions, thereby exposing the monomers to catalysts present in the reactor, polymerization of the monomers occurs. The polymer products result from the formation of "micro-particle clusters" on the activation sites of the catalyst particles. As the micro-particle clusters develop, spaces are often present between the clusters. These spaces lead to voids of space in the polymer granular particles as the micro-particle clusters grow and develop into granular polymer "macro-particles." For example, in polyethylene particles made in a gas phase reactor, there may often exist a void of 10 to 25 percent by volume.

The size of voids present in a granular polymer particle may partially depend upon the activity of the catalysts in the fluidized bed reactor. A sudden halt of catalytic activity may contribute to the existence of voids. Such a halt may result for example from a rise in temperature such that the temperature exceeds the catalyst's threshold temperature for activity. Such heat may be generated from the polymerization process itself. Inadequate removal of this heat generated from the polymerization process may further result in temperature gradients within the growing polymer particle. See S. Floyd, et al., "Polymerization of Olefins through Heterogeneous Catalysis III. Polymer Particle Modelling with an Analysis of Intraparticle Heat and Mass Transfer Effects," J. App. Polymer Sci, vol. 32, 2935-60 (1986). W. H. Ray, et al., "Polymerizaton of Olefins through Heterogeneous Catalysis X: Modeling of Particle Growth and Morphology," J. App. Polymer Sci., vol. 44, 1389-1414 (1992) also teaches that greater heat and mass transfer resistance may lead to higher internal voids within granular polymer particles. Significant polymer particle overheating has also been hypothesized as a cause for particle sticking and agglomeration problems in gas phase polymerizations.

The existence of the voids in the polymer often necessitates that the polymer granules undergo a high-energy consumption pelleting procedure, whereby the granular particles are melted to produce pellets having a density similar to that of the polymer density and a desired size. When there is no void in polymer pellets, the density of the pellets will be identical to the polymer density. Such pellets are often desired by customers as they allow for efficiency in transportation and handling. The pelleting procedure, however, contributes significantly to manufacturing and operating costs.

When the granular particle density of the polymer granules discharged from the reactor is relatively similar to the polymer density, the pelleting procedure can be eliminated. Granular particles that are discharged with the proper particle size and/or particle size distribution can be delivered directly to the customers after purging out residual hydrocarbons.

Minimization of void space and thus maximization of bulk density or granular particle density may allow for an increase in reactor inventory, in which case a given reactor would be equivalent to a larger reactor having a higher production capacity, with fewer costs and time associated with a pelleting procedure that can either be improved or eliminated. Accordingly, there exists a need for a polymerization process by which polymer particles having a less void and a greater granular particle density may be achieved.

SUMMARY OF INVENTION

In one aspect, the present invention relates to a process that involves passing a gaseous stream comprising at least one monomer through a fluidized bed reactor in the presence of a catalyst to form a polymeric product having a first granular particle density of less than or equal to about 850 kg/m$^3$, contacting the polymeric product with at least one particle density promoting agent to increase the granular particle density of the polymeric product by at least 2%, withdrawing the polymeric product having an increased granular particle density and a recycle stream comprised of unreacted monomers, and cooling and reintroducing the recycle stream into the fluidized bed reactor with sufficient additional monomer to replace the monomer polymerized and withdrawn as the polymeric product.

In another aspect, the present invention relates to a process that involves polymerizing olefins in the fluidized bed reactor to form polymerized olefins having a first granular particle density of less than or equal to about 850 kg/m$^3$, adding at least one particle density promoting agent to the fluidized bed reactor to increase the granular particle density of the polymerized olefins by at least 2%, and isolating polymerized olefins having a granular particle density greater than or equal to a predetermined granular particle density.

In yet another aspect, the present invention relates to a polymer produced by a process that involves passing a gaseous stream comprising at least one monomer through a fluidized bed reactor in the presence of a catalyst to form a polymeric product having a first granular particle density of less than or equal to about 850 kg/m$^3$, contacting the polymeric product with at least one particle density promoting agent to increase the granular particle density of the polymeric product by at least 2%, withdrawing the polymeric product having an increased granular particle density and a recycle stream comprised of unreacted monomers, and cooling and reintroducing the recycle stream into the fluidized bed reactor with sufficient additional monomer to replace the monomer polymerized and withdrawn as the polymeric product.

Other aspects and advantages of the invention will be apparent from the following description and the appended claims.

DETAILED DESCRIPTION

In one aspect, embodiments of the invention relate to processes for producing a polymer. In particular, embodiments of the invention relate to processes for controlling the granular particle density of polymer particles in a gas phase polymerization.

Figure 1:
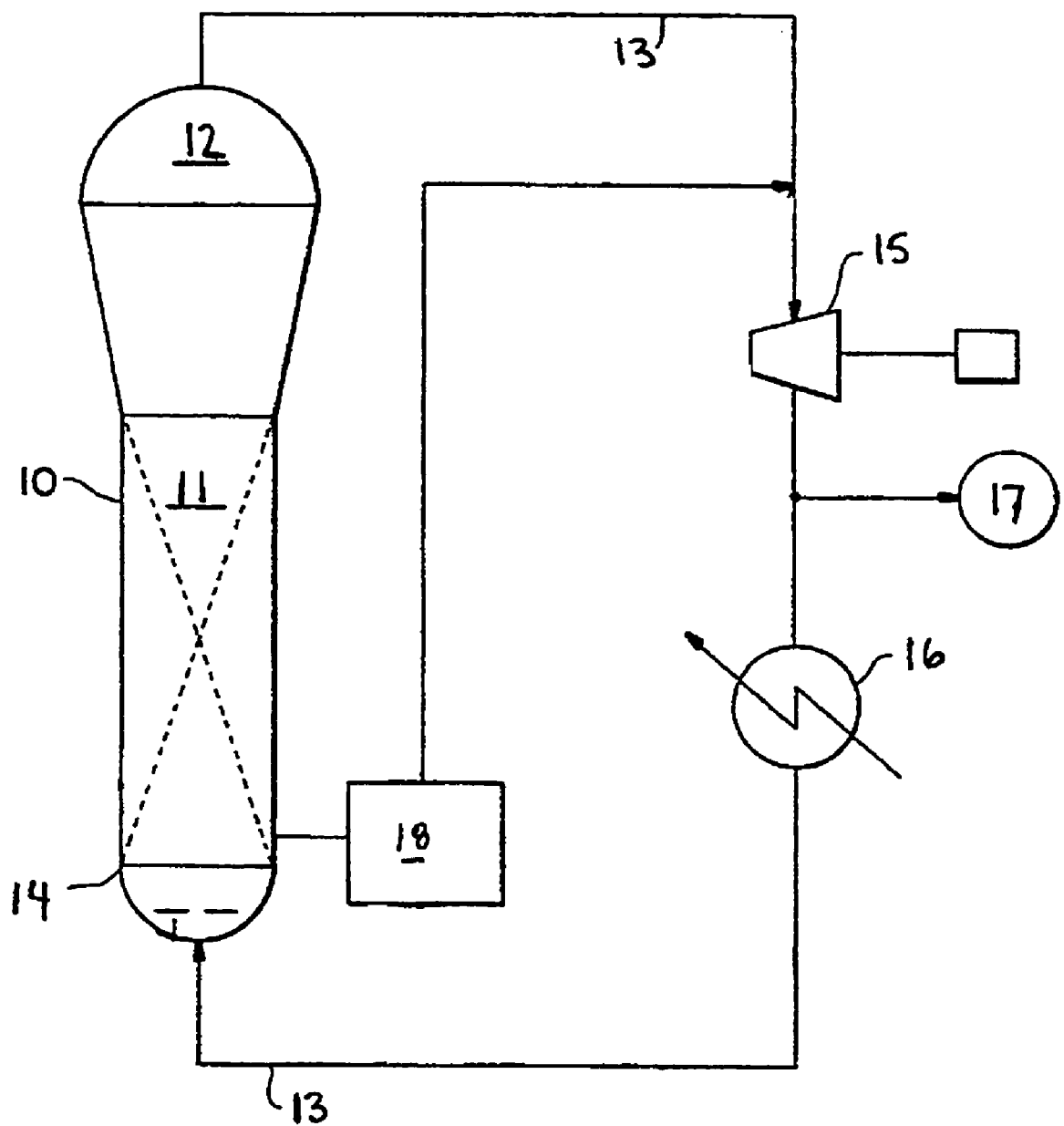
FIG. 1 is a schematic illustration of a fluidized bed reactor.

Referring to FIG. 1, a fluidized bed reactor, which may be used in gas phase polymerizations, is shown. The fluidized bed reactor 10 includes a reaction zone 11 and a velocity reduction zone 12. The reaction zone 11 includes a fluidized bed comprising growing polymer particles, formed polymer particles, and small amounts of catalyst, fluidized by the continuous flow of a recycle stream or fluidizing medium 13. The recycle stream 13 of gaseous components may include both make-up feed and fluid recycled through the fluidized bed reactor 10. The recycle stream enters the fluidized bed reactor 10 through a distribution plate 14 at the bottom of the reaction zone 11. The distribution plate 14 aids in uniform distribution of the recycle stream 13 and also support the solid particles of the fluidized bed. Fluidization of the fluidized bed in the reaction zone 11 results from the high rate at which the recycle stream 13 flows into and through the fluidized bed reactor 10, typically on the order of 50 times the rate of feed of any make-up feed. The high rate of the recycle stream 13 allows for the superficial gas velocity necessary to suspend and mix the fluidized bed in the reaction zone 11 in a fluidized state.

The recycle stream 13 passes upward through the reaction zone 11, absorbing heat generated by the polymerization process. The portion of the recycle stream 13 that does not react in the reaction zone 11 will leave the reaction zone 11 and pass through the velocity reduction zone 12. In the velocity reduction zone 12, most polymer particles entrained within the recycle stream 13 will drop back down into the reaction zone 11, thereby reducing the amount of polymer particles that may exit the fluidized bed reactor 10 with the recycle stream 13. Once the recycle stream 13 flows out of the velocity reduction zone 12, it is compressed by a compressor 15. A gas analyzer 17 will analyze samples from the recycle stream 13, prior to its return to the fluidized bed reactor 10, to monitor the composition of the recycle stream and determine any amount of make-up feed necessary to maintain a predetermined composition. The gas analyzer 17 typically analyzes samples prior to the recycle stream 13 passing through a heat exchanger 16. After compression, the recycle stream 13 flows through the heat exchanger 16 to remove the heat generated by the polymerization process and cool the recycle stream 13.

Figure 2:
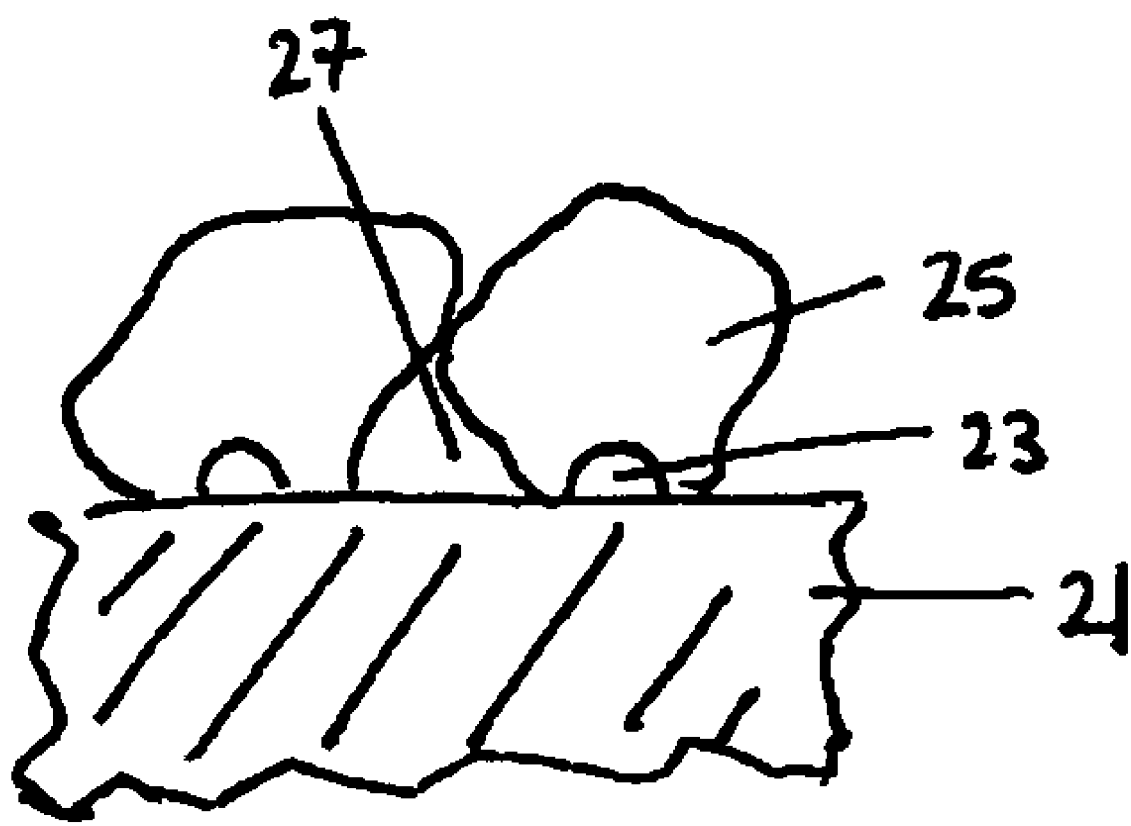
FIG. 2 illustrates a mechanism of polymer particle growth in polymerization reactors.

When a continuous flow of olefin monomers in the recycle stream 13 is exposed to catalysts present in the fluidized bed reactor 10, polymerization of the monomers occurs. A mechanism of polymer particle growth in a fluidized bed reactor 10 may be shown in FIG. 2. When a solid catalyst 21 is fed into the reactor, the activation sites 23 on the catalyst particle 21 trigger the polymerization reaction and proliferation of the monomers into polymer micro-particle cluster 25. Each catalyst particle 21 may allow for many such polymer micro-particle clusters 25 to grow and develop on the catalyst 21 such that the catalyst may eventually fragment into small particles surrounded by growing granular polymer macro-particles.

As the polymer micro-particle clusters 25 grow, the spaces 27 among those polymer micro-particle clusters 25 develop into pockets of voids within a larger polymer macro-particle. Polymer macro-particles having a larger volume of voids results in a lower granular particle density. The granular particle density, also referred to as envelope density, takes into account the entire volume occupied by an object, including the object's pores, cavities, or in the present case, voids.

If growth of polymer micro-particle clusters 25 stops quickly, the spaces 27 among neighboring polymer micro-particle clusters 25 or voids in the polymer macro-particle are less likely to be filled by polymer. Therefore, a relatively large volume of such voids will remain within the granular polymer particle, resulting in a less dense polymer particle. The amount of the polymer particles occupied by voids may range from 5% to 40% of the polymer particle volume. More specifically, the void volume may account for 10% to 25% of the polymer particles.

Referring back to FIG. 1, following the polymerization and formation of polymer particles, the polymerization product may be removed from the fluidized bed reactor at a discharge point 18. Although not shown, it may be desirable to separate any fluid from the product and return the fluid to the fluidized bed reaction 10. Also not shown, the polymer product may be subsequently analyzed for desired properties such as particle size, particle size distribution, melt index, and density and products having such properties may be isolated.

According to one embodiment of the present invention, a gaseous stream comprising at least one monomer may be continuously passed through a fluidized bed reactor in the presence of a catalyst to form a polymeric product having a first granular particle density of less than or equal to about 850 kg/m$^3$. The polymeric product may be contacted with at least one particle density promoting agent to increase the granular particle density of the polymeric product by at least 2%. The polymeric product having an increased density and a recycle stream comprised of unreacted monomers may be withdrawn from fluidized bed reactor, and the withdrawn recycle stream may be cooled and reintroduced into the fluidized bed reactor with sufficient additional monomer to replace the monomer which was polymerized and withdrawn as the polymeric product.

According to another embodiment of the preset invention, olefin monomers may be polymerized in the fluidized bed reactor to form polymerized olefins having a first granular particle density of less than or equal to about 850 kg/m$^3$. At least one particle density promoting agent may be added to the fluidized bed reactor to increase the granular particle density of the polymerized olefins by at least 2%. The polymerized olefins having a granular particle density greater than or equal to a predetermined granular particle density may be isolated from polymer products not meeting the predetermined density.

In some embodiments, the first granular particle density may be less than or equal to about 800 kg/m$^3$. In other embodiments, the first granular particle density may be less than or equal to about 650 kg/m$^3$.

In some embodiments, the granular particle density is increased from the first granular particle density by at least 2%. In other embodiments, the granular particle density is increased from the first granular particle density by at least 5%. In yet other embodiments, the increased granular particle density of the polymeric product is greater than about 650 kg/m$^3$.

According to yet another embodiment of the present invention, a gaseous stream comprising monomers may be continuously passed through the fluidized bed reactor in the presence of a catalyst. Polymer particles may be formed from the monomers on the catalyst. At least one of the polymer particles or the catalyst may be cooled by the stream.

According to some embodiments of the present invention, at least a portion of the recycle stream is condensed prior to reintroducing the recycle stream into the fluidized bed reactor. In some embodiments, the at least one particle density promoting agent induces condensing of the recycle stream. In another embodiments, an agent other than the at least one particle density promoting agent induces condensing of the recycle stream.

According to other embodiments, the dew point of the recycle stream is increased.

Some embodiments of the present invention include a particle density promoting agent in gas phase polymerization processes. It has been discovered by the present inventors that by adding a relatively small amount of at least one inert compounds into the recycle stream, while keeping all other operating conditions unchanged or not significantly changed, the granular particle density of the polymer products may be increased, either by reducing or eliminating internal voids that may be formed for example according to the mechanism shown in FIG. 2. Such a compound or compounds are referred to as particle density promoting agents (PDPAs).

For many polymerization catalysts, their activities decrease as the temperature increases. When temperature of the reactor, the fluidized bed, the catalyst, or the polymer particles surrounding the catalyst is raised above a threshold for a given catalyst, the catalyst's activity can even cease. Specifically, during the growth of the polymer particles, the polymer temperature increases due to heat generated by the polymerization, might not be adequately removed. Therefore, if the temperature of polymer micro-particle clusters and/or growing macro-particles reaches the catalyst's threshold, the growth of the polymer micro-particle clusters on the catalyst activation sits might suddenly cease, creating a large volume of voids within the polymer particles. In such a case, reducing the temperature of polymer micro-particle clusters during the polymerization becomes essential to reduce intra-particle voids and achieve a high particle density.

When other operating conditions (such as the catalyst and the polymer) are fixed, the temperature of the polymer particle is directly related to the particle-to-fluid (most likely particle to gas) heat-transfer coefficient, h. This heat-transfer coefficient is in turn related to the operating parameters of a fluidized bed in the following form:

$$\frac{d_p h}{k_g} = 2 + (0.6 \sim 1.8) \left( \frac{d_p U_0 \rho_g}{\mu} \right)^{1/2} \left( \frac{C_{pg} \mu}{k_g} \right)^{1/3} \quad (1)$$

where $C_{pg}$ is specific heat of fluid (most likely gas), $d_p$ is average particle size in the bed, $k_g$ is thermal conductivity of the fluid (most likely gas), $U_0$ is superficial fluid (most likely gas) velocity in the bed, $\rho_g$ is density of fluid (most likely gas), and $\mu$ is fluid (most likely gas) viscosity.

Under the operating conditions of a gas-phase polymerization reactor, the value of $(d_p h/k_g)$ is significantly larger than 2. Therefore, Eq.(1) can be approximated to:

$$\frac{d_p h}{k_g} = (0.6 \sim 1.8) \left( \frac{d_p U_0 \rho_g}{\mu} \right)^{1/2} \left( \frac{C_{pg} \mu}{k_g} \right)^{1/3} \quad (2)$$

Taking into account that the gas velocity and average particle size in the bed are usually fixed values, the following relationship can be derived from Eq.(2):

$$h \propto k_g^{2/3} \rho_g^{1/2} C_{pg}^{1/3} \mu^{-1/6} \quad (3)$$

It can be shown from Eq.(3) that the parameters that affect the particle-to-gas heat-transfer coefficient are, in the order of their influence level, thermal conductivity of the gas, gas density, specific heat of the gas, and gas viscosity. A "heat-transfer promoting index," $I_H$, can be defined as:

$$I_H = k_g^{2/3} \rho_g^{1/2} C_{pg}^{1/3} \mu^{-1/6} \quad (4)$$

This index may be applied to individual components in the fluidizing gas or to the overall gas composition in the gas-phase polymerization reactor. The unit of $I_H$ is $J \cdot m^{-2} \cdot K^{-1} \cdot sec^{-0.5}$.

Because catalysts' activation sites are not always on the outer surface of the catalyst, polymer micro-particle clusters may grow within the particle, with polymer macro-particles surrounding and eventually enveloping the catalyst particles. Therefore, the delivery and withdrawal of a species having a relatively high thermal conductivity or a relatively high $I_H$ into and out of the polymer particles may become a mechanism of cooling the polymer micro-particle clusters. However, even if a gas composition has a relatively high $I_H$, but insufficient amounts of the high thermal conductivity agents are delivered into the polymer particles, the agents will not sufficiently cool the polymer and/or catalyst to prevent catalytic shut-down. Thus, large volumes of voids may be present, and the granular particle density of the polymer particle would not be significantly increased. Hence, a gas composition having the property of a high $I_H$ does not necessitate a polymer having a high granular particle density.

The capability of a high thermal conductivity agent (or a high $I_H$ agent) to cool the internal polymer micro-particle clusters may also depend on the availability and speed of that agent to permeate within and withdraw from the particle. A component having a high solubility within the polymer particles indicates that a relatively large amount of that component can permeate the polymer particle. A component having a high diffusivity in the polymer particle indicates that it can quickly move in and out of the polymer particle. Thus, an agent having relatively high diffusivity and relatively high solubility may contribute to the agent's ability to cool the polymer particle and achieve a relatively high particle density.

The absolute amount and efficiency of a component available for the local intra-particle cooling is also determined by the driving force, the difference in concentration of that component within and outside the polymer particle. Therefore, a high $I_H$ agent having a high concentration in the fluidizing gas may have a more significant effect in cooling the polymer particles and increasing the particle density.

Because the solubility of the agent may depend upon operating conditions such as temperature, etc. and the type of polymer being formed, the normal boiling point (i.e., the boiling temperature at ambient pressure) of the agent may be employed to roughly judge the relative differences in the solubilities of different components.

In addition, some components may induce a "swelling effect." A swelling effect may be observed when the adsorption of those components by the polymer particles causes the polymer particles to swell. In turn, the pathway for diffusion into the polymer particles may widen, assisting the move of those components into and out of the particles, and further cooling the polymer particles. It may be observed that agents with strong swelling effects have a relatively high solubility in the polymer.

Considering the many variables that may have a role in particle cooling and polymer micro-particle cluster growth, a proper selection of the gas composition, with respect to $I_H$, diffusivity in polymer, solubility in polymer, swelling effect, concentration, etc., may increase or even maximize a polymer's granular particle density.

During typical operations of a fluidized bed reactor, the ability to change the gas composition of the recycle stream flowing through the reactor is dependent upon such factors as those including catalyst type, product specification, reactor pressure rating, and equipment specification. Therefore, it is often difficult to significantly manipulate the gas composition to maximize $I_H$ for the purpose of particle density increase. However, by adding relatively small amount of one or more than one inert PDPAs (particle density promoting agents) into the recycle stream, without significantly changing other operating conditions, the granular particle density may be increased by reducing or eliminating internal voids.

According to some embodiments of the present invention, at least a significant fraction of PDPA exists in the gas-phase in a significant portion of the reactor, because in a gas-phase, PDPA may more effectively reduce void volume. Typically, the distribution and dispersion of liquid within most of the dense fluidized-bed is less uniform (e.g., in the form of droplets) than that of a gas, making a compound in a liquid phase less available for cooling individual particles. Thus, according to some embodiments of the present invention, a limit to a selected particle density promoting agent's normal boiling point may be desirable.

In one embodiment of the present invention, the at least one particle density promoting agent may include at least one organic compound. The at least one organic compound may include at least one hydrocarbon, and/or at least one fluorine-containing compound.

In another embodiment of the present invention, the at least one particle density promoting agent may include at least one compound selected from the group consisting of C5-C20 alkanes, C5-C20 cyclo-alkanes comprising 5-18 member rings, internal unsaturated hydrocarbons, aromatic hydrocarbons, hydroflourocarbons, chlorohydrocarbons, and mixtures thereof. In yet another embodiment, the at least one particle density promoting agent may further include a saturated hydrocarbon having fewer than five carbon atoms.

As used herein, a relative $I_H$ value is calculated for pure or 100% PDPA at the reactor temperature and pressure (the pure PDPA may be in a liquid state, although it often appears in a gas state after flashed in the reactor). It would be obvious to one of ordinary skill in the art that a relative $I_H$ value calculated for the PDPA when it is in a gas state that would differ from the $I_H$ value calculated for a PDPA in a liquid state. Thus, the exact method of determining the $I_H$ for the PDPA is not intended to be a limitation on the scope of the present invention.

According to some embodiments of the present invention, the at least one particle density promoting agent has a relative $I_H$ of greater than about 250, calculated at reactor temperature and pressure (e.g., 250° C. and 2.16×10$^6$ Pa-gauge). Examples of relative $I_H$ values calculated at a sample reactor temperature and pressure for a non-exhaustive list of representative compounds that may be included in the at least one particle density promoting agent are shown below in Table 1.

TABLE 1

| Compound | $I_H$ | Temperature (° C.) | Pressure (Pa-gauge) |
|---|---|---|---|
| iso-Butane | 277.3 | 87.5 | 2.16 × 10$^6$ |
| n-Butane | 297.1 | 87.5 | 2.16 × 10$^6$ |
| iso-Pentane | 289.8 | 87.5 | 2.16 × 10$^6$ |
| n-Pentane | 300.8 | 87.5 | 2.16 × 10$^6$ |
| 2,2-Dimethylbutane | 272.7 | 87.5 | 2.16 × 10$^6$ |
| Cyclopentane | 322.6 | 87.5 | 2.16 × 10$^6$ |
| 2,3-Dimethylbutane | 283.6 | 87.5 | 2.16 × 10$^6$ |
| 2-methylpentane | 290.2 | 87.5 | 2.16 × 10$^6$ |
| 3-methylpentane | 292.5 | 87.5 | 2.16 × 10$^6$ |
| n-Hexane | 300.9 | 87.5 | 2.16 × 10$^6$ |
| Methylcyclopentane | 299.7 | 87.5 | 2.16 × 10$^6$ |
| n-Octane | 309.6 | 87.5 | 2.16 × 10$^6$ |
| 1,1-Dimethylcyclohexane | 280.0 | 87.5 | 2.16 × 10$^6$ |

According to other embodiments of the present invention, the at least one particle density promoting agent has a normal boiling point in the range of from about 25° C. to about 150° C.

According to other embodiments of the present invention, the at least one particle density promoting agent comprises at least 0.5 mol % of the recycle stream.

According to other embodiments of the present invention, the at least one particle density promoting agent comprises at least 1.5 mol % of the recycle stream. In other embodiments of the present invention, the concentration may range from about 0.5 to about 50%. Within this range, particular embodiments may use 1%, 2%, 3%, 5%, 10%, 15%, 20%, 25%, 30%, 35%, or 40%.

As noted above, gas phase polymerization reactions may be carried out via any exothermic polymerization process in a gas phase fluidized bed. Preferably, the present invention is employed in fluidized bed polymerizations (that may be mechanically stirred and/or gas fluidized), with those utilizing a gas phase being most preferred. The present invention is not limited to any specific type of fluidized or gas phase polymerization reaction and can be carried out in a single reactor or multiple reactors such as two or more reactors in series. In addition to well-known conventional gas phase polymerization processes, it is within the scope of the present invention that "condensing mode", including the "induced condensing mode" and "liquid monomer" operation of a gas phase polymerization may be used.

Embodiments of the present invention may employ a condensing mode polymerization, such as those disclosed in U.S. Pat. Nos. 4,543,399; 4,588,790; 4,994,534; 5,352,749; and 5,462,999. Condensing mode processes may be used to achieve higher cooling capacities and, hence, higher reactor productivity. Referring back to FIG. 1, in these polymerizations, the recycle stream 13, or a at least a portion thereof, may be cooled to a temperature below the dew point in a fluidized bed polymerization process, resulting in condensing all or at least a portion of the recycle stream 13. The recycle stream 13 may then be returned to the reactor 10. The dew point of the recycle stream 13 can be increased by increasing the operating pressure of the reaction/recycle system and/or increasing the percentage of condensable fluids and decreasing the percentage of non-condensable gases in the recycle stream 13. Condensable fluids added may be inert to the catalyst, reactants, and the polymer product produced. Further, condensable fluids may include saturated or unsaturated hydrocarbons and/or monomers and comonomers of the system. The condensing fluid can be introduced into the recycle stream 13 at any point in the system.

In addition to condensable fluids of the polymerization process itself, other condensable fluids inert to the polymerization may be introduced to induce a condensing mode operation, such as by the processes described in U.S. Pat. No. 5,436,304. Examples of suitable condensable fluids may be selected from liquid saturated hydrocarbons containing 2 to 8 carbon atoms such as ethane, propane, n-butane, isobutane, n-pentane, isopentane, neopentane, n-hexane, isohexane, and other saturated C6 hydrocarbons, n-heptane, n-octane and other saturated C7 and C8 hydrocarbons, and mixtures thereof. Condensable fluids may also include polymerizable condensable comonomers such as olefins, alpha-olefins, diolefins, diolefins containing at least one alpha olefin, and mixtures thereof. In condensing mode, it is desirable that the liquid entering the fluidized bed is dispersed and vaporized quickly. In one embodiment of the present invention, the at least one particle density promoting agent may operate to induce a condensing mode operation. In another embodiment of the present invention, condensing mode operation may be induced by an agent other than the at least one particle density promoting agent.

Other embodiments of the preset invention may also use a liquid monomer polymerization mode such as those disclosed in U.S. Pat. No. 5,453,471; U.S. Ser. No. 08/510,375; PCT 95/09826 (US) and PCT 95/09827 (US). When operating in the liquid monomer mode, liquid can be present throughout the entire polymer bed provided that the liquid monomer present in the bed is adsorbed on or in solid particulate matter present in the bed, such as polymer being produced or inert particulate material (e.g., carbon black, silica, clay, talc, and mixtures thereof), so long as there is no substantial amount of free liquid monomer present. Operating in a liquid monomer mode may also make it possible to produce polymers in a gas phase reactor using monomers having condensation temperatures much higher than the temperatures at which conventional polyolefins are produced.

In general, a liquid monomer mode process is conducted in a stirred bed or gas fluidized bed reaction vessel having a polymerization zone containing a bed of growing polymer particles. The process may include continuously introducing a stream of one or more monomers and optionally one or more inert gases or liquids into the polymerization zone, continuously or intermittently introducing a polymerization catalyst into the polymerization zone, continuously or intermittently withdrawing polymer product from the polymerization zone, continuously withdrawing unreacted gases from the zone; and compressing and cooling the gases while maintaining the temperature within the zone below the dew point of at least one monomer present in the zone. If there is only one monomer present in the gas-liquid stream, at least one inert gas is preferably present. Typically, the temperature within the zone and the velocity of gases passing through the zone are such that essentially no liquid is present in the polymerization zone that is not adsorbed on or in solid particulate matter.

Typically, the fluidized bed polymerization process is conducted at a pressure ranging from about 10 to 1000 psi, preferably about 200 to about 600 psi and a temperature ranging from about 10° C. to about 150° C., preferably about 40° C. to about 125° C. During the polymerization process the superficial gas velocity ranges from about 0.7 to 3.5 feet/second, and preferably about 1.0 to 2.7 feet/second.

Illustrative of the polymers which may be produced in accordance with some embodiments of the present invention include the following: homopolymers and copolymers of C2-C18 alpha olefins; polyvinyl chlorides, ethylene propylene rubbers (EPRs); ethylene-propylene diene rubbers (EPDMs); polyisoprene; polystyrene; polybutadiene; polymers of butadiene copolymerized with styrene; polymers of butadiene copolymerized with isoprene; polymers of butadiene with acrylonitrile; polymers of isobutylene copolymerized with isoprene; ethylene butene rubbers and ethylene butene diene rubbers; polychloroprene; norbornene homopolymers and copolymers with one or more C2-C18 alpha olefin; terpolymers of one or more C2-C18 alpha olefins with a diene and the like.

Monomers that may be used in various embodiments of the present invention include one or more of the following: C2-C18 alpha olefins such as ethylene, propylene, and optionally at least one diene such as those taught in U.S. Pat. No. 5,317,036 and including for example, hexadiene, dicyclopentadiene, octadiene including methyloctadiene (e.g., 1-methyl-1,6-octadiene and 7-methyl-1,6-octadiene), norbornadiene, and ethylidene norbornene; readily condensable monomers such as those taught in U.S. Pat. No. 5,453,471 including isoprene, styrene, butadiene, isobutylene, chloroprene, acrylonitrile, cyclic olefins such as norborrenes, and the like.

Any type of polymerization catalyst may be used in the polymerization process of the present invention. For example, the range of catalysts that may be used includes a single catalyst or a mixture of catalysts; a soluble or insoluble, supported or unsupported catalyst; and a prepolymer, spray dried with or without a filler, a liquid, or a solution, slurry/suspension or dispersion. These catalysts are used with cocatalysts and promoters well known in the art. For example, these may include alkylaluminums, alkylaluminum halides, alkylaluminum hydrides, as well as aluminoxanes.

For illustrative purposes only, examples of suitable catalysts include Ziegler-Natta catalysts, including titanium based catalysts such as those described in U.S. Pat. Nos. 4,376,062 and 4,379,758. Ziegler-Natta catalysts are well known in the art and typically are magnesium/titanium/electron donor complexes used in conjunction with an organoaluminum cocatalyst.

Also suitable are chromium-based catalysts such as those described in U.S. Pat. Nos. 3,709,853, 3,709,954, and 4,077,904; vanadium based catalysts such as vanadium oxychloride and vanadium acetylacetonate, such those as described in U.S. Pat. No. 5,317,036; metallocene catalysts and other single-site or single-site-like catalysts such as those taught in U.S. Pat. Nos. 4,530,914, 4,665,047, 4,752,597, 5,218,071, 5,272,236, 5,278,272, 5,317,036, and 5,527,752; cationic forms of metal halides, such as aluminum trihalides, anionic initiators such as butyl lithiums; cobalt catalysts and mixtures thereof such as those described in U.S. Pat. Nos. 4,472,559 and 4,182,814; and nickel catalysts and mixtures thereof such as those described in U.S. Pat. Nos. 4,155,880 and 4,102,817.

Rare earth metal catalysts, i.e., those containing a metal having an atomic number in the Periodic Table of 57 to 103, are further suitable catalysts, such as compounds of cerium, lanthanum, praseodymium, gadolinium and neodymium. Specifically, carboxylates, alcoholates, acetylacetonates, halides (including ether and alcohol complexes of neodymium bichloride), and allyl derivatives of such metals, e.g., of neodymium may be used. Neodymium compounds, particularly neodymium neodecanoate, octanoate, and versatate, and n-alkyl neodymium are preferable rare earth metal catalysts. Rare earth catalysts may be preferred when to produce polymers polymerized using butadiene, styrene, or isoprene and the like.

According to some embodiments of the present invention, catalysts for the process of the present invention may preferably include rare earth metal catalysts, titanium catalysts, chromium catalysts, nickel catalysts, vanadium catalysts, and metallocene/single-site/single-site-like catalysts.

EXAMPLES

All the following examples are related to commercial scale operations conducted in a gas-phase fluidized bed polymerization reactor. The reactor used for these examples has a cylindrical reaction section with a diameter of 5.11 m, and an expanded section above the reaction section to reduce the gas velocity. The dense fluidized-bed level was controlled around 13.4 m above the distributor plate. Superficial gas velocity in the reactor ranged from 0.61 to 0.69 m/s. The reactor was operated under a pressure of $2.16 \times 10^6$ Pa (gauge) and a temperature of 87.5° C. A spray-dried Ziegler-Natta catalyst was used to make LLDPE (ethylene-butene copolymer) with a polymer density of 918.0 kg/m$^3$ (target set-point) and a melt index of 2.0 dg/min.

Particle density can be measured by using ASTM D2873-94 Standard (via Mercury Intrusion Porosimetry). The test method was developed for measuring the interior pore volume and the apparent pore diameter distribution of porous poly(vinyl chloride) resins; however, it may be applied to other polymers including polyethylene and polypropylene. The measurements are made by forcing mercury under increasing pressure through a graduated penetrometer into the open pores of the resin samples. The volume of mercury forced into the pores is defined from the change of the mercury volume in the penetrometer; the apparent pore diameter distribution can be defined from incremental volume changes with increasing pressure. Settled bulk density may be measured by gently pouring the polymer resin into a stainless standard cylinder and determining the weight of the resin for the given volume of the filled cylinder.

The gas compositions of those examples were controlled to the following:

Ethylene partial pressure: $8.4 \times 10^5$ Pa
Butene/ethylene molar ratio: 0.305
Hydrogen/ethylene molar ratio: 0.160

The PDPA employed in these examples is a mixture of saturated hydrocarbons with the following composition (in mol %), the mixture having a relative $I_H$ of 292.0, calculated at reactor temperature and pressure:

| | |
|---|---|
| iso-Butane | 0.01 |
| n-Butane | 0.03 |
| iso-Pentane | 0.02 |
| n-Pentane | 2.24 |
| 2,2-Dimethylbutane | 3.9 |
| Cyclopentane | 2.48 |
| 2,3-Dimethylbutane | 8.98 |
| 2-Metyl pentane | 2.67 |
| 3-Methyl pentane | 16.9 |
| n-Hexane | 2.55 |
| Methyl cyclopentane | 0.22 |

Unless otherwise indicated, all numbers expressing quantities of ingredients, properties, reaction conditions, and so forth, used in the specification and claims are to be understood as approximations based on the desired properties sought to be obtained by the present invention, and the error of measurement, etc., and should at least be construed in light of the number of reported significant digits and by applying ordinary rounding techniques. Notwithstanding that the numerical ranges and values setting forth the broad scope of the invention are approximations, the numerical values set forth are reported as precisely as possible.

Detailed operation results of these examples are listed in Table 2.

TABLE 2

| | Example | | | |
|---|---|---|---|---|
| | 1 | 2 | 3 | 4 |
| Product | LLDPE | LLDPE | LLDPE | LLDPE |
| Comonomer | 1-butene | 1-butene | 1-butene | 1-butene |
| Catalyst | Ziegler-Natta | Ziegler-Natta | Ziegler-Natta | Ziegler-Natta |
| Polymer Density (kg/m$^3$) | 919.0 | 918.5 | 918.5 | 918.7 |
| Flow index (dg/min) | 2.0 | 2.0 | 2.0 | 2.0 |
| Reactor Pressure (Pa-gauge) | $2.16 \times 10^6$ | $2.16 \times 10^6$ | $2.16 \times 10^6$ | $2.16 \times 10^6$ |
| Reactor Temperature (° C.) | 87.5 | 87.5 | 87.5 | 87.5 |
| Superficial Gas Velocity (m/s) | 0.61 | 0.64 | 0.69 | 0.69 |
| mol % of PDPA in the fluidizing fluid | 1.9 | 2.4 | 3.1 | 3.7 |
| Weight Averaged Particle Size (mm) | 0.637 | 0.646 | 0.713 | 0.591 |
| Settled Bulk Density of Particles (kg/m$^3$) | 350 | 356 | 373 | 400 |
| Density of Granular Particles (kg/m$^3$) | 630 | 641 | 671 | 718 |

It can be seen from Table 2 that the inclusion of PDPA in the fluidizing affects the density of the particles. For example, the 3.7 mol % included in Example 4 achieved a 14% increase in the granular particle density of the LLDPE produced as compared to Example 1 having 1.9 mol %. Furthermore the mol % of PDPA included is shown to affect the particle density. As shown through Examples 1-4 in Table 2, as the mol % of PDPA increases from 1.9 to 2.4, 3.1, and 3.7 mol %, the particle density respectively increases from 630 to 641, 671, and 718 kg/m$^3$.

Thus, embodiments of the present invention advantageously provide an increase in density as compared to untreated products. For example, increases of greater than 5%, greater than 7%, or greater than 10% may be seen, based on the mol % of PDPA used.

Additionally, while the above description makes reference to various mechanisms of particle growth, no limitation is intended on the scope of the invention by such a description. It is specifically within the scope of the present invention that other known mechanisms, for example, one that may include thermal cracking of hydrocarbons are contemplated and may contribute to the final morphology of the granular polymer particle.

Advantageously, embodiments of the present invention may provide for a polymerization process which minimizes the void space in the formed polymer particles and thus maximizes the granular particle density, without significantly affecting the activity of the catalysts. Other embodiments of the present invention may allow for an increase in reactor inventory, higher production capacity, and a process which may either improve or eliminate costly pelleting procedures.

Furthermore, various embodiments may allow for a process by which a polymer having a predetermined density is selected.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A continuous process for increasing a granular particle density of a polymeric product using at least one particle density promoting agent, comprising:
    passing a gaseous stream comprising at least one monomer through a fluidized bed reactor in the presence of a catalyst to form a polymeric product having a first granular particle density of less than or equal to 850 kg/m$^3$;
    contacting the polymeric product with at least one particle density promoting agent to increase the granular particle density of the polymeric product by at least 2%;
    isolating the polymeric product having the at least 2% increased granular particle density from polymer products not having an increased granular particle density;
    withdrawing the polymeric product having an increased granular particle density and a recycle stream comprised of unreacted monomers; and
    cooling and reintroducing the recycle stream into the fluidized bed reactor with sufficient additional monomer to replace the monomer polymerized and withdrawn as the polymeric product;
    wherein the at least one particle density promoting agent is added to the recycle stream such that the recycle stream comprises at least 0.5 mole % of the at least one particle density promoting agent.

2. The process of claim 1, wherein the at least one particle density promoting agent comprises at least one compound selected from the group consisting of C$_5$-C$_{20}$ alkanes, C$_5$-C$_{20}$ cyclo-alkanes comprising 5-18 member rings, internal unsaturated hydrocarbons, aromatic hydrocarbons, hydroflourocarbons, chlorohydrocarbons, and mixtures thereof.

3. The process of claim 1, wherein the at least one particle density promoting agent has a relative I$_H$ of greater than 250.

4. The process of claim 1, wherein the at least one particle density promoting agent has a normal boiling point in the range of from about 25°C. to about 150°C.

5. The process of claim 1, wherein the at least one particle density promoting agent comprises at least 1.5 mol% of the recycle stream.

6. The process of claim 1, further comprising condensing at least a portion of the recycle stream prior to reintroducing the recycle stream into the fluidized bed reactor.

7. The process of claim 6, wherein the at least one particle density promoting agent induces condensing of the recycle stream.

8. The process of claim 1, wherein the increased granular particle density of the polymeric product is at least 5% greater than the first granular particle density.

9. The process of claim 1, wherein at least a portion of the at least one particle density promoting agent exists in the fluidized bed reactor as a gas.

10. The process of claim 1, wherein the polymeric product has a first granular particle density of less than or equal to 650 kg/m$^3$.

11. A process for controlling a granular particle density of a polymer produced in a fluidized bed reactor, comprising:
    polymerizing olefins in the fluidized bed reactor to form polymerized olefins having a first granular particle density of less than or equal to 850 kg/m$^3$;
    adding at least one particle density promoting agent to the fluidized bed reactor to increase the granular particle density of the polymerized olefins by at least 2%; and
    isolating polymerized olefins having a granular particle density greater than or equal to a predetermined granular particle density from polymer products not having an increased granular particle density, wherein the granular particle density of the isolated polymerized olefins is at least 2% greater than the first granular particle density;
    wherein the at least one particle density promoting agent is added to the recycle stream such that the recycle stream comprises at least 0.5 mole % of the at least one particle density promoting agent and wherein the particle density promoting agent includes iso-butane, n-butane, iso-pentane, n-pentane, 2,2-dimethylbutane, cyclopentane, 2,3-dimethylbutane, 2-methylpentane, 3-methylpentane, n-hexane, methylcyclopentane, n-octane, 1,1-dimethylcyclohexane, or a combination thereof.

12. The process of claim 11, wherein the at least one particle density promoting agent comprises at least one compound selected from the group consisting of C$_5$-C$_{20}$ alkanes, C$_5$-C$_{20}$ cyclo-alkanes comprising 5-18 member rings, internal unsaturated hydrocarbons, aromatic hydrocarbons, hydroflourocarbons, chlorohydrocarbons, and mixtures thereof.

13. The process of claim 11, wherein the at least one particle density promoting agent has a relative I$_H$ of greater than 250.

14. The process of claim 11, wherein the at least one particle density promoting agent has a normal boiling point in the range of from about 25° C. to about 150° C.

15. The process of claim 11, wherein the at least one particle density promoting agent comprises at least 1.5 mol% of the recycle stream.

16. The process of claim 11, wherein the increased granular particle density of the polymerized olefins is at least 5% greater than the first granular particle density.

17. The process of claim 11, wherein the polymeric product has a first granular particle density of less than or equal to 650 kg/m$^3$.

18. The process of claim 1, wherein—said PDPA comprises, in mole percent: iso-Butane 0.0 1%, n-Butane 0.03%, iso-Pentane 0.02%, n-Pentane 2.24%, 2,2-Dimethylbutane 3.9%, Cyclopentane 12.48%, 2,3-Dimethylbutane 8.98%, 2-Methyl pentane 52.67%, 3-Methyl pentane 16.9%, n-Hexane 2.55%, and Methyl cyclopentane 0.22%.

19. The process of claim 11, wherein said PDPA comprises, in mole percent: iso-Butane 0.01%, n-Butane 0.03%, iso-Pentane 0.02%, n-Pentane 2.24%, 2,2-Dimethylbutane 3.9%, Cyclopentane 12.48%, 2,3-Dimethylbutane 8,98%, 2-Methyl pentane 52.67%, 3-Methyl pentane 16.9%, n-Hexane 2.55%, and Methyl cyclopentane 0,22%.

* * * * *

UNITED STATES PATENT AND TRADEMARK OFFICE
CERTIFICATE OF CORRECTION

PATENT NO. : 7,714,082 B2  
APPLICATION NO. : 11/243406  
DATED : May 11, 2010  
INVENTOR(S) : Ping P. Cai and William A. Matthews Page 1 of 1

It is certified that error appears in the above-identified patent and that said Letters Patent is hereby corrected as shown below:

In Column 11, Line 51, "2.48" should be deleted, and -- 12.48 -- inserted therefore.

In Column 11, Line 53, "2.67" should be deleted, and -- 52.67 -- inserted therefore.

Signed and Sealed this

Third Day of August, 2010

David J. Kappos  
*Director of the United States Patent and Trademark Office*